US009584658B2

(12) United States Patent
Cohen et al.

(10) Patent No.: US 9,584,658 B2
(45) Date of Patent: Feb. 28, 2017

(54) CALL DISTRIBUTION TECHNIQUES

(71) Applicant: TelTech Systems, Inc., South Amboy, NJ (US)

(72) Inventors: Meir Cohen, Lakewood, NJ (US); Eliyahu Finkelman, Woodmere, NY (US); Ethan Garr, Aberdeen, NJ (US); Bryan Moyles, Marlboro, NJ (US)

(73) Assignee: TelTech Systems, Inc., South Amboy, NJ (US)

( * ) Notice: Subject to any disclaimer, the term of this patent is extended or adjusted under 35 U.S.C. 154(b) by 0 days.

(21) Appl. No.: 15/203,377

(22) Filed: Jul. 6, 2016

(65) Prior Publication Data
US 2017/0013122 A1 Jan. 12, 2017

Related U.S. Application Data

(60) Provisional application No. 62/189,736, filed on Jul. 7, 2015, provisional application No. 62/297,110, filed on Feb. 18, 2016.

(51) Int. Cl.
*H04M 3/42* (2006.01)
*H04M 3/436* (2006.01)
*H04L 29/06* (2006.01)
*G10L 25/51* (2013.01)
*G10L 17/02* (2013.01)

(52) U.S. Cl.
CPC .............. *H04M 3/436* (2013.01); *G10L 17/02* (2013.01); *G10L 25/51* (2013.01); *H04L 63/1491* (2013.01); *H04L 65/1006* (2013.01); *H04M 3/42017* (2013.01)

(58) Field of Classification Search
CPC .. H04M 1/663; H04M 3/436; H04M 1/72577; H04M 3/38; H04M 3/42017; H04M 3/42059
USPC ............ 379/210.02, 211.01, 207.16, 201.01, 379/207.02, 207.15
See application file for complete search history.

(56) References Cited

U.S. PATENT DOCUMENTS 8,948,350 B2 * 2/2015 Hodge .................... H04M 1/67 379/114.14

* cited by examiner

*Primary Examiner* — Thjuan K Addy
(74) *Attorney, Agent, or Firm* — Koffsky Schwalb LLC; Mark I. Koffsky

(57) ABSTRACT

Increasing the efficiency of phone call usage is accomplished by using strategic call forwarding techniques to analyze incoming calls and process these calls in real time to: 1) divert unwanted robocallers and/or 2) provide information about unknown human callers. Robocallers are detected by analyzing incoming calls to determine if the audio is human-based or generated by a robocaller. Information about unknown human callers is obtained by real-time look up and reporting techniques to allow the user to determine whether to answer a call.

20 Claims, 13 Drawing Sheets

CALL DISTRIBUTION TECHNIQUES

RELATED APPLICATION

This application claims the benefit of U.S. Provisional Patent Application Ser. No. 62/189,736 filed on Jul. 7, 2015 and U.S. Provisional Patent Application Ser. No. 62/297,110, filed on Feb. 18, 2015.

FIELD OF THE DISCLOSURE

The present invention relates to the field of improved techniques for the effective routing of telephone calls so that unwanted calls are diverted from the user.

BACKGROUND

Although phones (including mobile phones) have added incredible efficiency to people's lives, unwanted calls can be annoying, intrusive and damaging. Sources of such calls include: a) machine-triggered calls that play pre-recorded messages ("robocallers"); and b) calls from humans that are unknown to the phone user.

Most robocallers are illegal. While many of these calls are benign sales calls, some are attempts to defraud consumers. But "do not call" registries and other legal remedies have had little ability to control or reduce this problem. Even legal robocallers are often unwanted, and consumers have had no tools available to avoid these intrusions.

Adding to the complexity, robocallers are not always unwanted by a user. For example, a school may use a robocaller to call all parents and inform them of an emergency school closing due to weather. Or a government agency may use a robocaller to warn citizens to seek shelter in view of a weather event or other emergency. It is therefore useful to distinguish between wanted and unwanted robocallers so that wanted robocallers reach the phone user without being blocked.

Moreover, when an unknown human is calling, it is useful for a phone user to know all possible information about a caller with an unrecognized number before deciding whether to answer a call, send the call to voice mail or blacklist the caller.

Accordingly, it is useful to provide a system and method for increasing the efficiency of phone call usage by using strategic call forwarding techniques to analyze incoming calls and process these calls in real time to: 1) divert unwanted robocallers and/or 2) provide information about unknown human callers.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
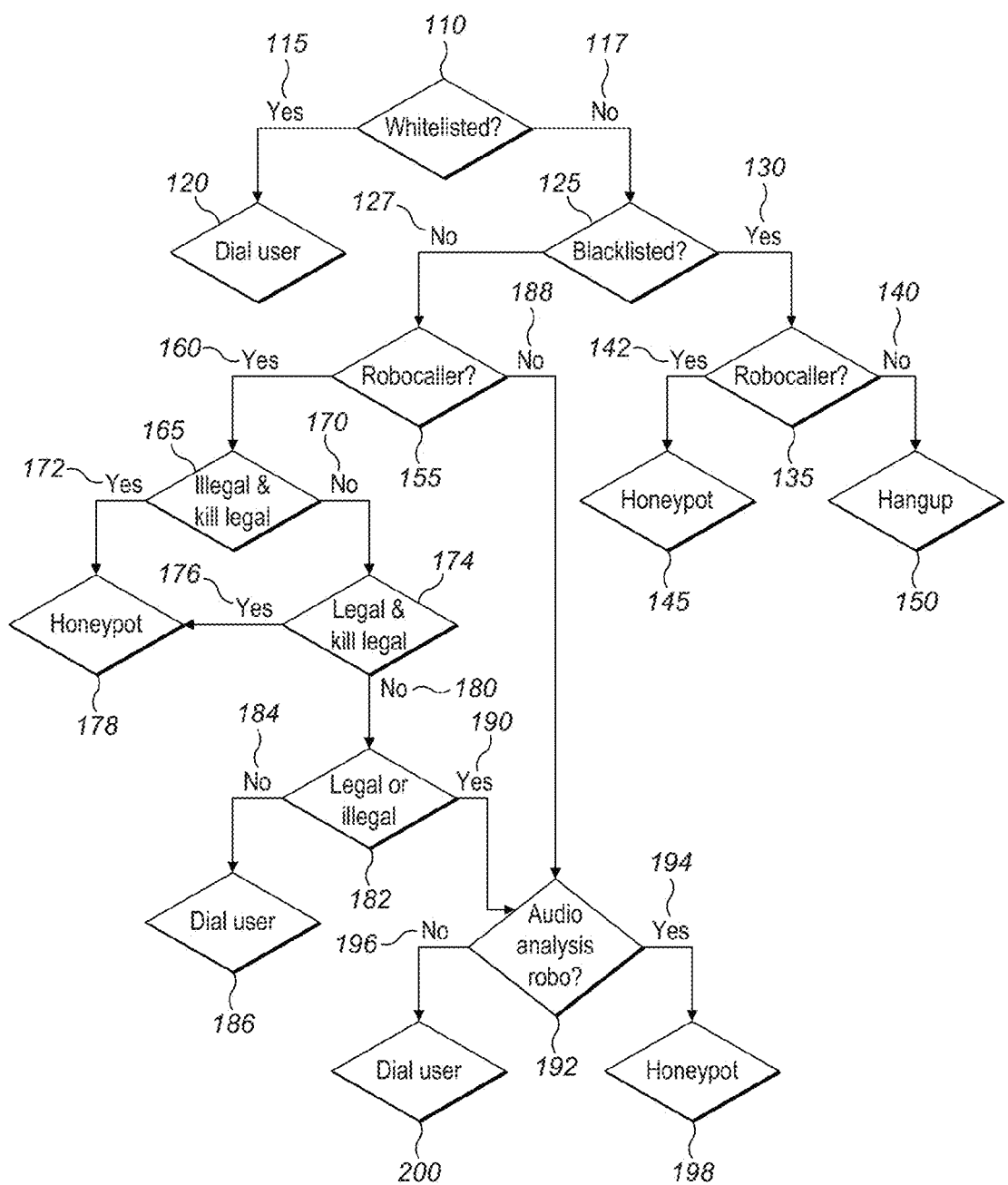
FIG. 1 is a flowchart showing a process of processing calls in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The linchpin of the inventions described herein is the use of call forwarding (whether absolute or conditional) by a user to forward incoming calls to a processing system. To set up the processing system, the user must program his or her phone to forward calls to a number specified by the processing system. The processing system then performs the necessary analysis to determine whether to forward the call back to the user to be answered, whether to send the call to voicemail or whether to not answer the call.

The processing system may operate independently of any carrier. The user need not change his/her phone number, and calls are received on the user's device as normal. In addition, during setup, the users may select various options for the processing system. For example, the user may allow access to whitelists (calls that are allowed to go through to the user under all circumstances that may include some or all of the user's contacts), and create blacklists (calls that are never allowed to through to the user under any circumstances). The blacklists may be maintained by the user or a central system that pools all known numbers that initiate malicious or spam calls. The central system may also maintain a list of known phone numbers that generate legal robocallers (such as from a school or government agency) and known phone numbers that generate illegal robocallers.

I. OVERVIEW ON HANDLING ROBOCALLERS

Turning to FIG. 1, shown is a flowchart illustrating a method of efficiently handling robocallers in accordance with some embodiments. This method may be called "ROBOKILLER".

When a call is received, the processing system first determines if the calling number is on a whitelist 110, that is a preset list of calls that are always allowed to go through to the user. If the call is on the whitelist 115 the processing system dials the user 120 and the call proceeds as discussed below.

If the call is not a whitelist 117, the processing system next determines if the calling number is on a blacklist 125, that is a preset list of calls that are never allowed to through to the user. If the call is on the blacklist 130, the processing system determines whether the call is from a robocaller 135 using techniques described below. If the blacklisted call is not from a robocaller 140, then the processing system hangs up 150. If the blacklist call is from a robocaller 142, the robocaller is directed to a honeypot system.

Honeypot systems are decoy servers or systems setup to gather information regarding an attacker or intruder into a system. In general, a honeypot system is setup to be easier prey for intruders such as robocallers than true production systems but with minor system modifications so that their activity can be logged or traced. Thus, once the robocaller calls into a system, the robocaller will call back for subsequent visits. During these subsequent visits, additional information can be gathered and additional attempts at file, security and system access on the honeypot can be monitored and saved. In so doing, it is possible to learn how intruders probe and attempt to gain access to the systems. This allows for better development of blacklists and/or numbers that generate illegal robocallers. The processing system can take this honeypot-generated information from one user and combine it with information generated from other users to make the system more efficient for all users.

Turning back to FIG. 1, if the call is not on the blacklist 127, the processing system runs the calling number against a list of known numbers that are used to generate robocallers 155. If the call does not appear to be from a robocaller after this first pass 188, additional audio analyses 192 may be performed to further determine if, in fact, the call is from a robocaller. The analyses will be discussed further herein. If it is determined that the call is from a robocaller 194, the call is sent to the honeypot system 198. If it is determined that the call is not from a robocaller 196, the user is dialed 200 and the call proceeds as discussed below.

In contrast, if the call is known to be from a robocaller after this first pass 160, the processing system performs an analysis to determine if the call comes from an illegal source and if the system has been set to kill illegal calls 165. If yes 172, the illegal to-be-killed-call is sent to the honeypot 178. If no 170, the processing system performs an analysis to determine if the call comes from a legal source and if the system has been set to kill legal calls 174. If yes 176, the legal-to-be-killed call is sent to the honeypot 178. If no 180, the processing system determines if the system is set to further analyze for robocallers 182 after the prior legal/illegal analysis is undertaken. If further analysis is not desired 184, the user is dialed 186 and the call proceeds as discussed below.

If further analysis is desired 190, additional audio analyses 192 are performed to further determine if, in fact, the call is from a robocaller. The analyses will be discussed further herein. If it is determined that the call is from a robocaller 194, the call is sent to the honeypot 198. If it is determined that the call is not from a robocaller 196, the user is dialed 200 and the call proceeds and the call proceeds as discussed below When the processing system dials the user 120, 186, 200, this may be accomplished via an app on the user's mobile phone using Session Initiation Protocol (SIP). SIP via an app may be used because after an unconditional call forward, it may not be possible to receive calls on the same device through POTS (Plain Old Telephone Service). Thus, calling the user back through the app on their phone is a unique method of overcoming this limitation. The decision may also be based on whether there is enough network/cell strength based on data throughput. If there is enough strength, then the call is forward to the application over VoIP using SIP. If there is not enough strength, the call is forwarding using POTS.

SIP is directed to the fact that there are many applications of the Internet that require the creation and management of a session, where a session is considered an exchange of data between an association of participants. The implementation of these applications is complicated by the practices of participants: users may move between endpoints, they may be addressable by multiple names, and they may communicate in several different media—sometimes simultaneously. Numerous protocols have been authored that carry various forms of real-time multimedia session data such as voice, video, or text messages. SIP works in concert with these protocols by enabling Internet endpoints (called user agents) to discover one another and to agree on a characterization of a session they would like to share. For locating prospective session participants, and for other functions, SIP enables the creation of an infrastructure of network hosts (called proxy servers) to which user agents can send registrations, invitations to sessions, and other requests. SIP is an agile, general-purpose tool for creating, modifying, and terminating sessions that works independently of underlying transport protocols and without dependency on the type of session that is being established.

At the user's option, calls send to the honeypot 145, 178, 198 may be recorded in a "spam" voice mail box and reviewed later by the caller. The caller may also have the option to designate such spam as calls that were actually desired. This information can be used by the processing system for more efficient future processing.

The order of these steps may be altered depending on the needs of the processing system. Further, steps may be deleted or additional steps added.

II. DETECTING ROBOCALLERS

To detect whether an incoming call is from a robocaller or not, the processing system is designed to capture prior testing of human callers vs. robocallers to then determine qualitative and quantitative differences. The processing system may use multiple points of analysis to determine whether a call is from a robocaller or from a human.

When a call comes in, the first step in detecting for a robocaller is for the processing system to simultaneously: 1) answer the call; and 2) send a ringtone to the speaker of the caller that mimics the ringtone that is sent by the phone system to a caller to indicate that the receiver's phone is still ringing. This ringtone may be called a ringback tone. A human caller will generally not start speaking because he or she will still hear the ringback tone (even though it is being simulated by the processing system). Nonetheless, the processing system will be listening to the background noise, generally without the human's knowledge. A call from a robocaller will begin speaking because it has detected that the call has, in fact, been picked up by the processing system. In either event, the processing system will listen and analyze the first few seconds of incoming audio to determine if the call is from a human or a robocaller.

FIGS. 2-5 show several modalities of analysis that are used to determine the original of a call using various parameters. All or some of these modalities may be used. Each of FIG. 2-5 show a sound wave 203 where the x-axis is time in seconds and the y-axis is the amplitude of the sound wave 203.

Figure 2:
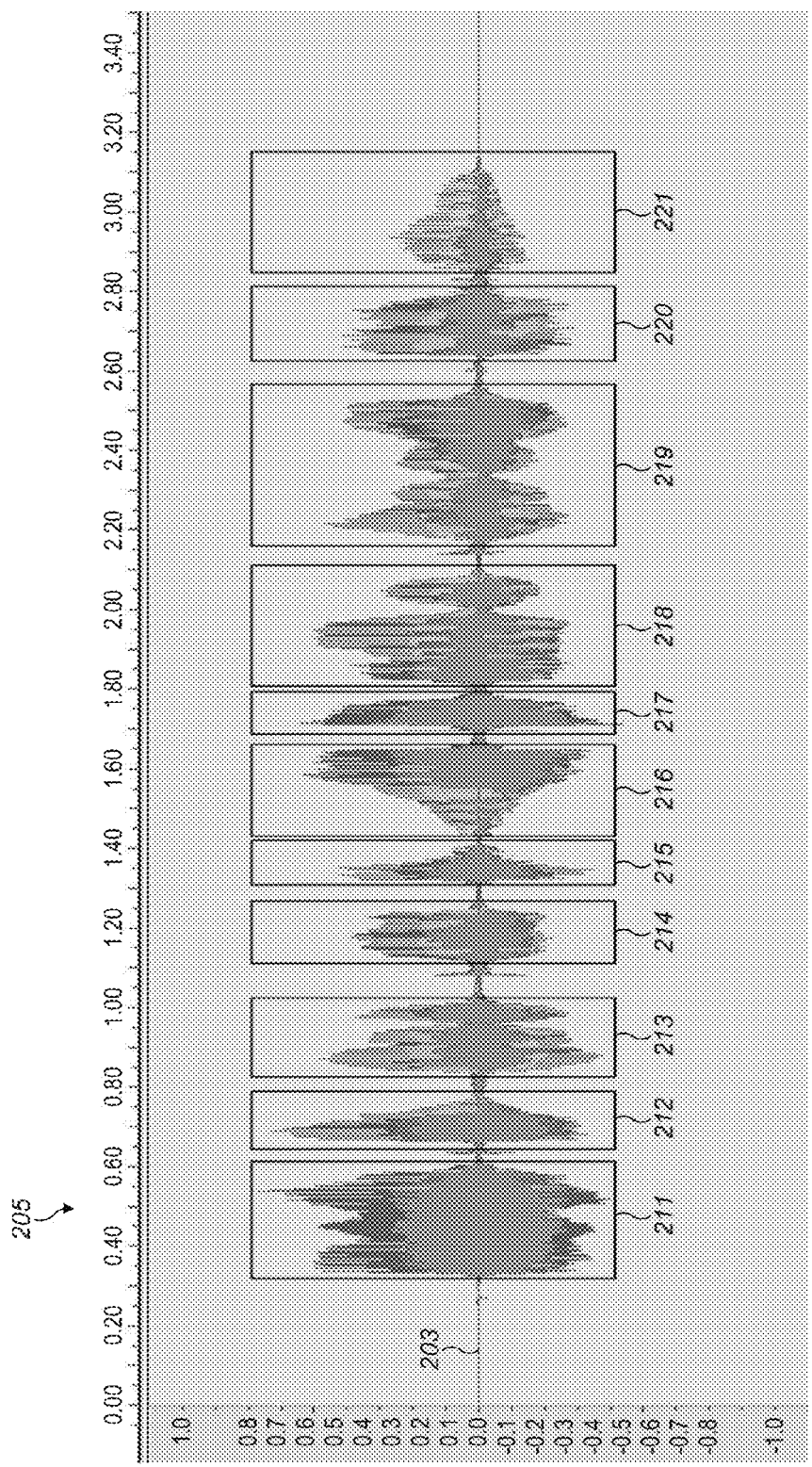
FIG. 2 shows a "substantial audio" analysis of an audio signal in accordance with some embodiments.

FIG. 2 shows a "substantial audio" analysis 205 of the sound wave 203. The frames 211 through 221 show chunks of contiguous audio. For each frame 211 through 221, the processing system calculates the average amplitude of the amount of noise produced in that frame. Any audio that exceeds a significant threshold above the average amplitude is considered as "substantial audio." If the audio has significant spikes above that average amplitude, the processing system then tallies such total peaks that fall within the realm of that significant point of audio to determine if they are bursts of speech (that are considered to be important for later processing) or background noise (to be filtered and ignored).

Figure 3:
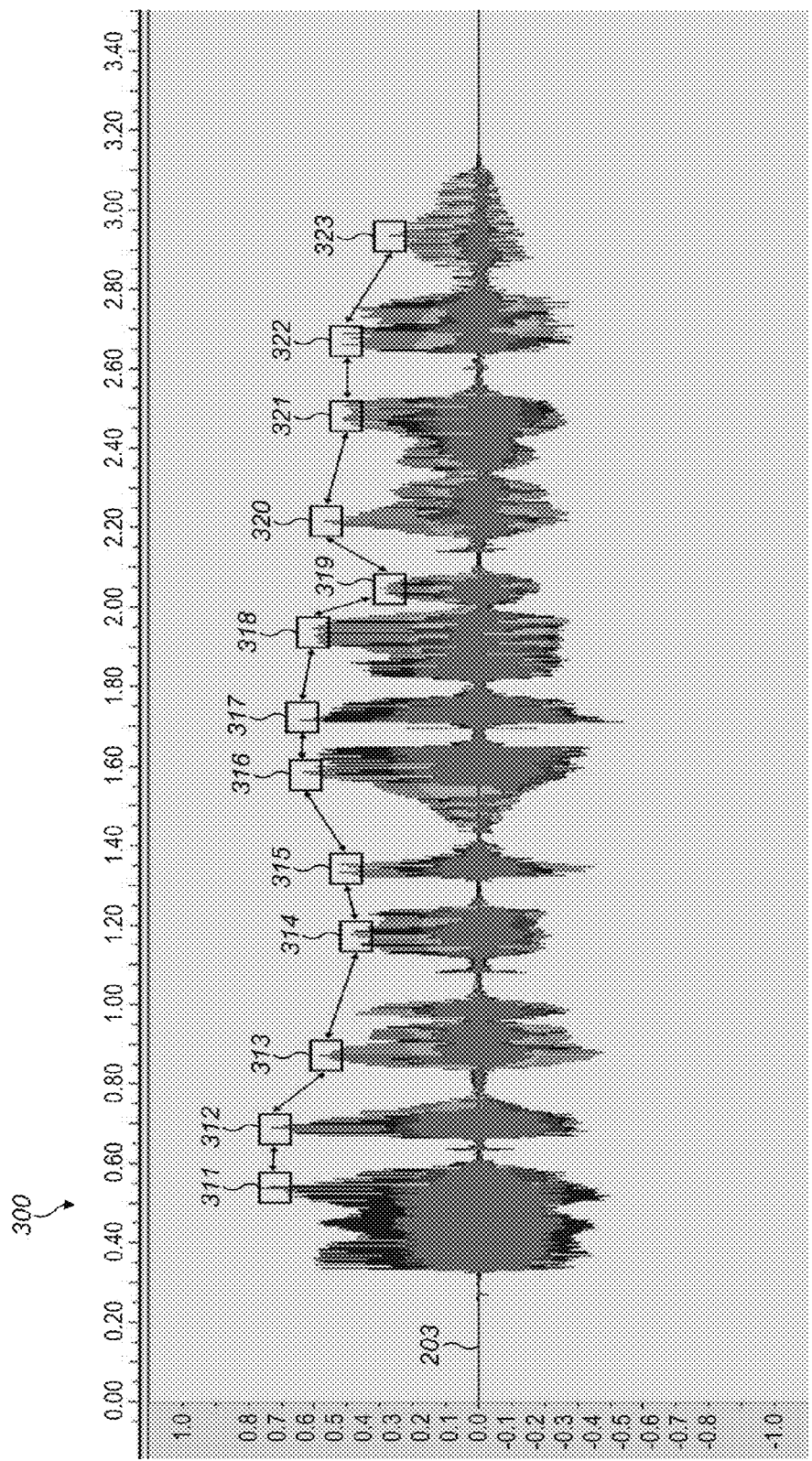
FIG. 3 shows an "audio spike" analysis of an audio signal in accordance with some embodiments.

FIG. 3 shows an "audio spike" analysis 300 of the sound wave 203. Here, the points of interest to the processing system are the significant spikes 311 through 323 in audio. The processing system analyzes the distance between the spikes (shown as arrows between 311 through 323) along with their regularity throughout the audio sample. Each segment of audio is analyzed and compared to the average height of the sound wave in that frame. A spike is considered significant when its height is near a segment of audio that has a height larger than when compared to the average height of the sound wave in that frame. Thus, a spike is determined dynamically according to the audio that surrounds it. If there are frequent spikes closely correlated around each other, the processing system determines them to be points of speech being emitted by a robocaller. Similar operations are performed on the bottom half of the audio wave.

Figure 4:
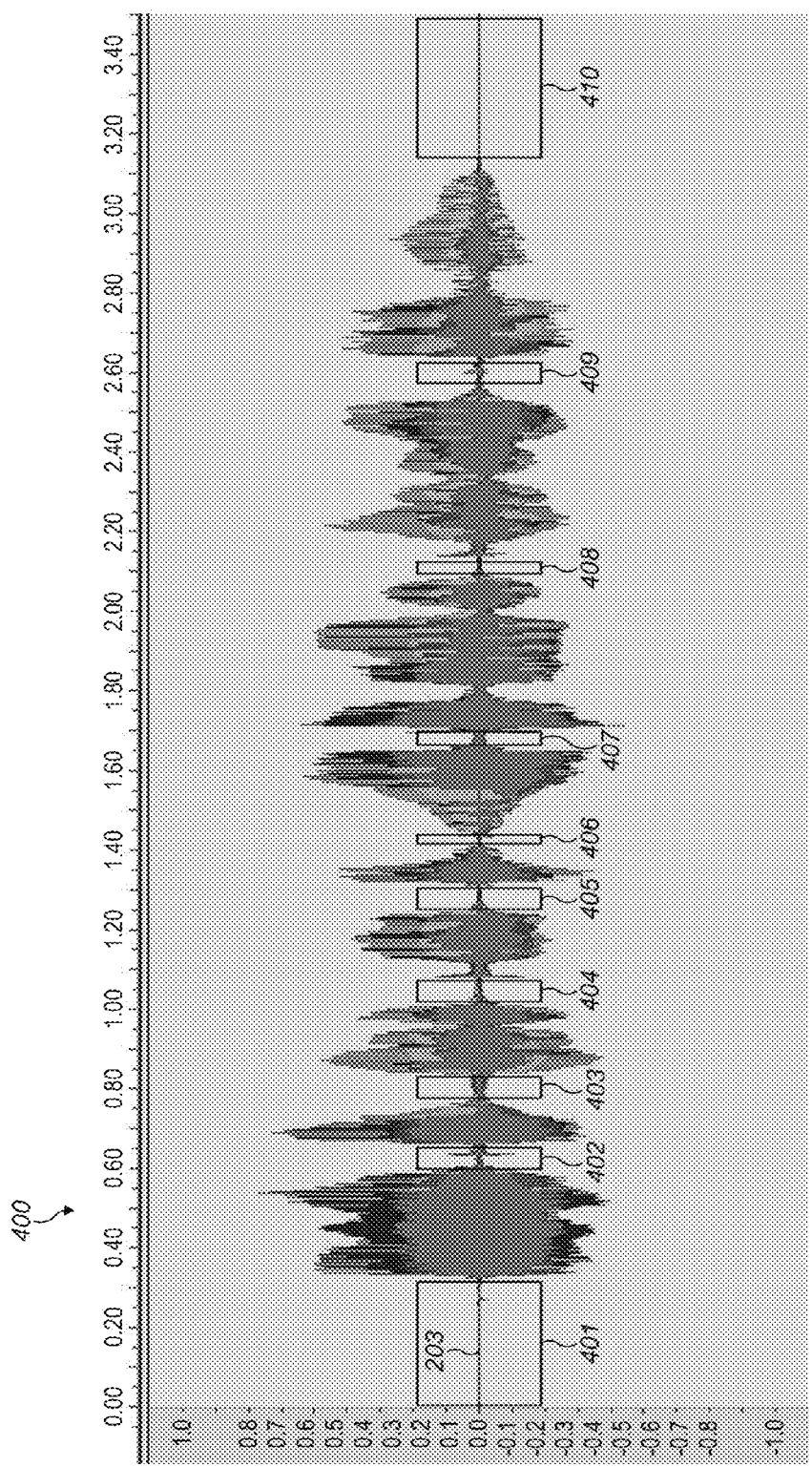
FIG. 4 shows a "silent chunk" analysis of an audio signal in accordance with some embodiments.

FIG. 4 shows a "silent chunk" analysis 400 of the sound wave 203. Here the processing system identifies noticeable "silent chunks" 401-410 in every audio frame. Extended periods of silence are more likely human or background noise, while robocaller speech tends to be continuous. The analysis for finding silence on audio signal is "smoothed" by ensuring that very small hiccups in audio are not considered to be silence. This prevents the analysis from creating false positives in finding silent chunks that occur over small breaks in the audio (such as those that are several milliseconds long).

Figure 5:
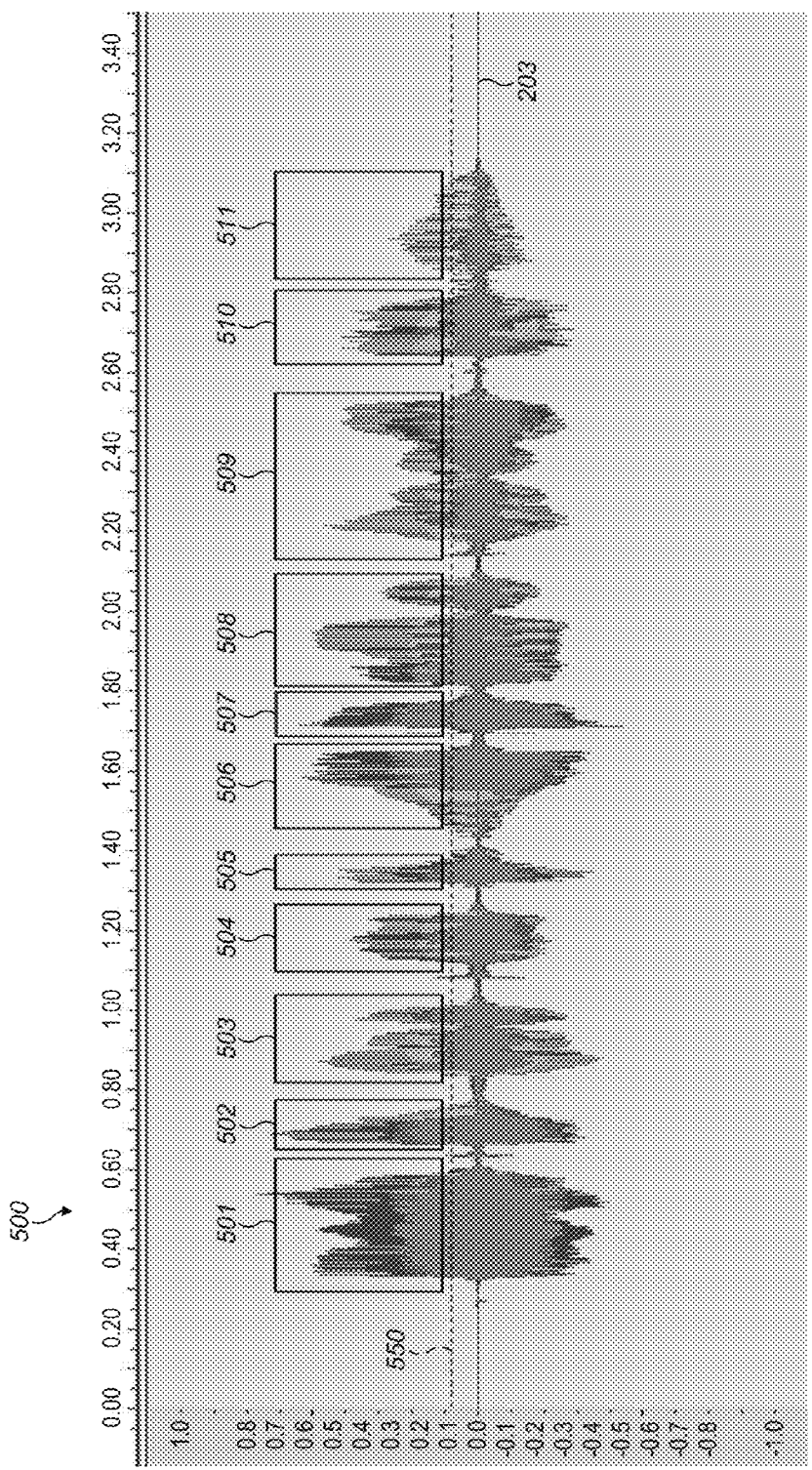
FIG. 5 shows an "average noise per frame" analysis of an audio signal in accordance with some embodiments.
Figure 6:
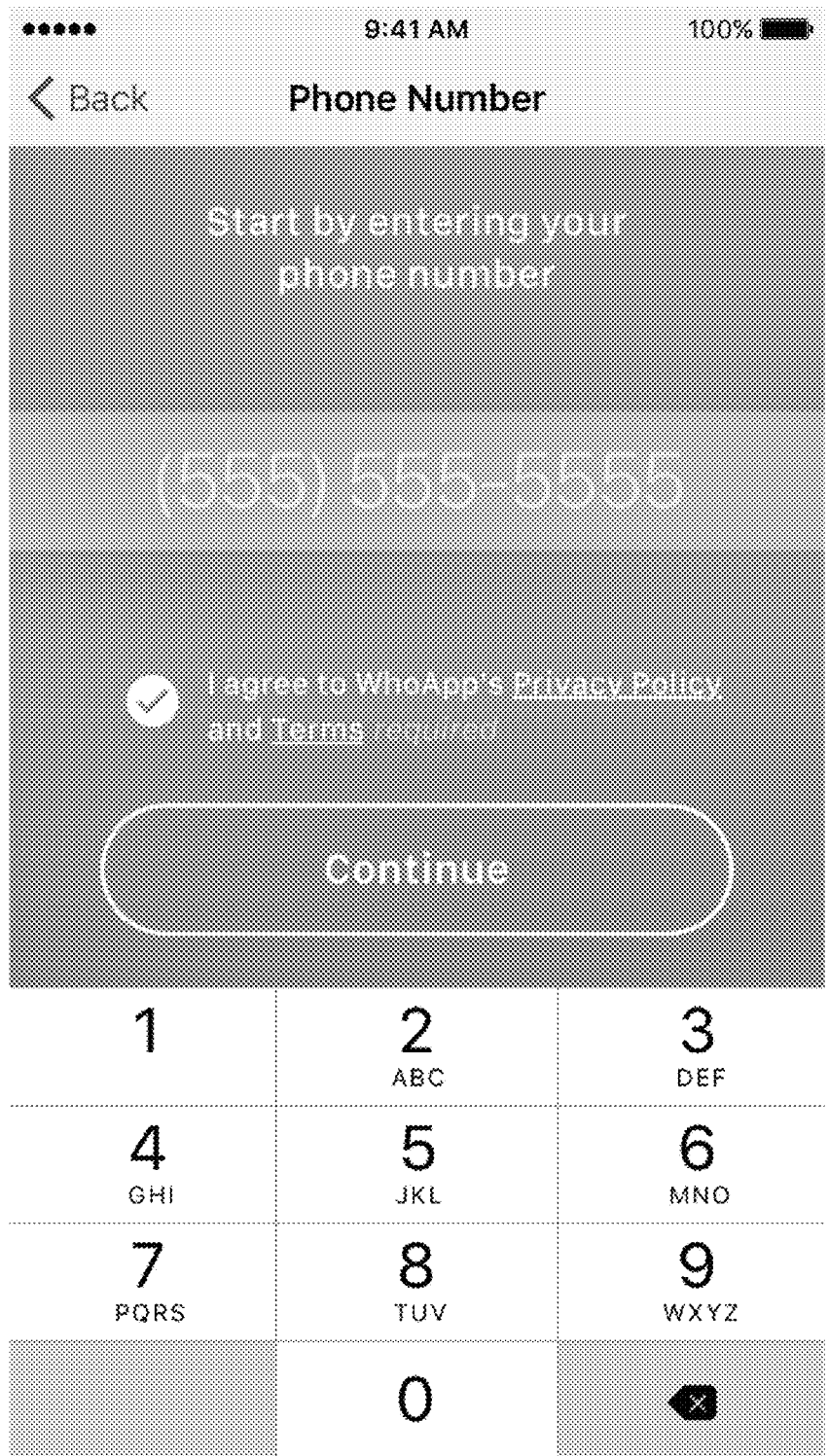
FIGS. 6-13 show graphic captures of steps of a system setup for obtaining real-time caller information.

FIG. 5 shows an "average noise per frame" analysis 500 of the sound wave 203. An average audio baseline 550 is established for the sound wave 203. Shown in the boxes 501 through 511 are chunks of audio that exceed 10% of the average audio baseline 550. If there is substantial audio in the sample and the average noise per frame is greater than 1/10th of that average audio baseline 550, the processing system considers the frame to be consistent audio indicative of a robocaller. Further, if the noise within a frame does not significantly deviate during a frame, the processing system awards points towards robocaller classification. A further goal of measuring the audio's standard deviation is to analyze whether or not the audio varies widely. If the audio varies widely, it is more likely to be a byproduct of random chunks of audio produced in the background, which means that a human is speaking. If the audio does not vary widely, it is more likely to be ongoing speech produced by a robocaller speaking. Similar operations are performed on the bottom half of the audio wave.

Once a raw score for each frame has been calculated, the processing system smoothes scores for low outliers that likely result from poor audio. Keeping this value low prevents artificial inflation of large low score areas not caused by static. The processing system then creates a rolling average of each frame from the previous three frames to smooth out outliers. Finally, the processing systems weighs "highly confident" areas of scoring to account for 25% of the probability, while averaging all probabilities to account for the remaining 75%. This results in a confidence score between 0-100. Scores below 50 are deemed human, while scores above this threshold are considered robocallers.

When the frames are all averaged out together, the following weighted factors may apply towards frames independently, as well as their averages as a whole to determine that the call is from a robocaller. 10 points may be added to the score if there is significant audio that is determined to be robotic. 10 points may be added to the score if the audio does not deviate widely, which helps the algorithm know whether or not the sound is sporadic or consistent with the quality of speech. 40 points may be added if the audio frame has a significant amount of audio that is not considered to be ambient background noise. 10 points may be added if there are only a few chunks of continuous silence, which indicate breaks in speech ongoing speech. 40 points may be added if there are many consistent spikes in audio that present themselves as speech cadence or ongoing annunciated points of speech.

The frame may then be adjusted towards a finding that the caller is human for any of the following factors. If there is a high level of repetitive noise in a frame that constitutes as the same noise over and over again, the processing system may deduct points all the way back down to 0 if the audio is highly repetitive. If the entire slice of audio recorded is shown to be highly similar, such as an ongoing beep tone, the entire score is deducted by 25 points. Scores are bound by 0 and 100, so a score cannot exceed 100 points or fall below 0 points in the final stage of grooming the score. This is to ensure that the point system can maintain a 0-100 scale and produce sane results that can be evaluated by other components based on the 0-50 being a human, and 51-100 being a robocaller.

This signal analysis may occur before, after or at the same time as an analysis of the whitelist processing and/or calling look-up processing of the calling number. In this regard, the processing system may determine whether the call should be forwarded to the recipient, sent to the spambox or terminated in a short amount of time so that the call recipient perceives the entire process as taking place in real time.

III. REAL-TIME CALL INFORMATION

There are dozens of services that provide CNAM (Caller ID Name), BNA (block numbering area) and other phone number lookup services to customers. These services allow users to perform static lookups on phone numbers to reveal publicly available data These services do not provide users with an in-stream real-time experience, which means they do not show users who is calling before they answer an unknown call. Further, no services currently use call forwarding (conditional or unconditional) to provide caller information.

The use of call forwarding may allow users to send unknown calls to the processing system before they are answered. The processing system is then able to research the number and ring back the call over SIP (Session Initiation Protocol) with detailed information aggregated from lists, crowdsourced data, and available APIs from services such as Google and Yelp.

The solution described herein (that may be called "WhoApp") provided real-time data about an unknown caller using the call forwarding feature and data extraction. This solution provides detailed information about the caller including, but not necessarily limited to:

Phone Number
Alternate Phone Numbers
Name
Street Address
City, State
Social Media Photo(s)
Contact List Image
Email
Address Street view
City Satellite view Map Satellite view
City Map view
Address Map View
Job title
Social Media Friends List Using conditional call forwarding (or unconditional call forwarding) the solution may provide an in-stream real-time experience on a mobile phone. This means that the research and data results offered are delivered to the user prior to the user needing to answer a placed call. (Other solutions only provide post-call lookup services.)

Figure 7:
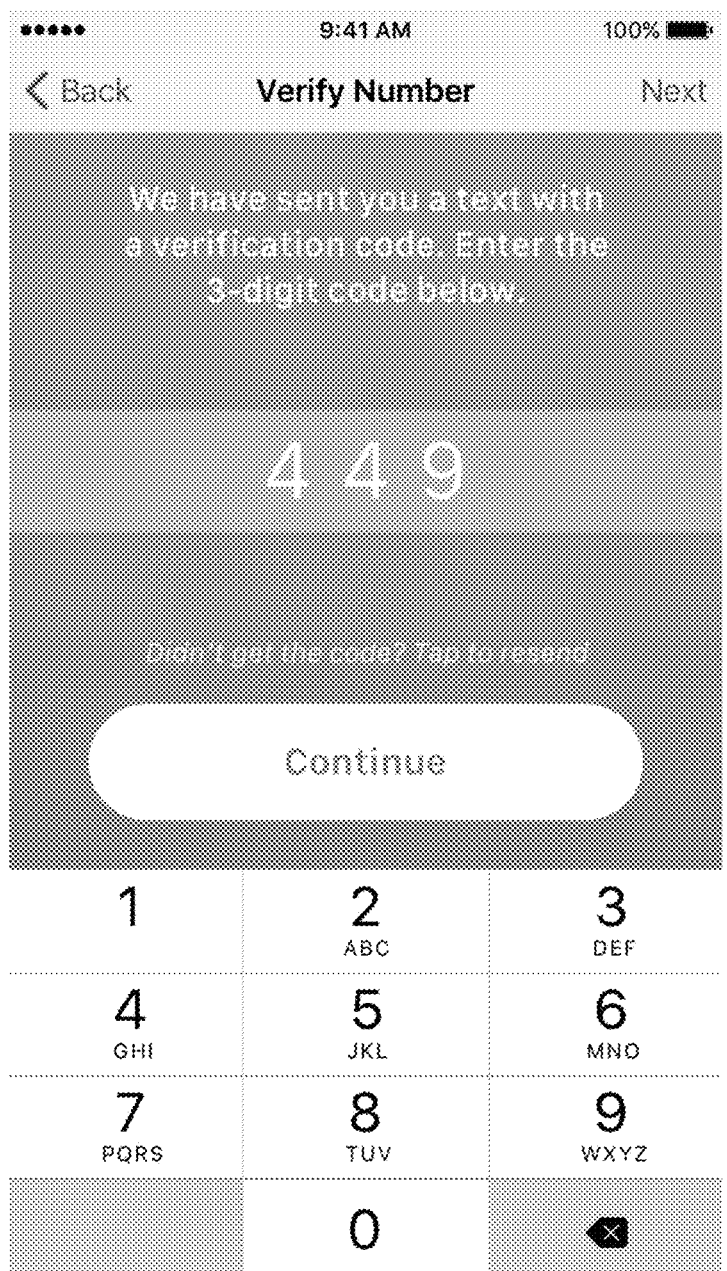
Figure 8:
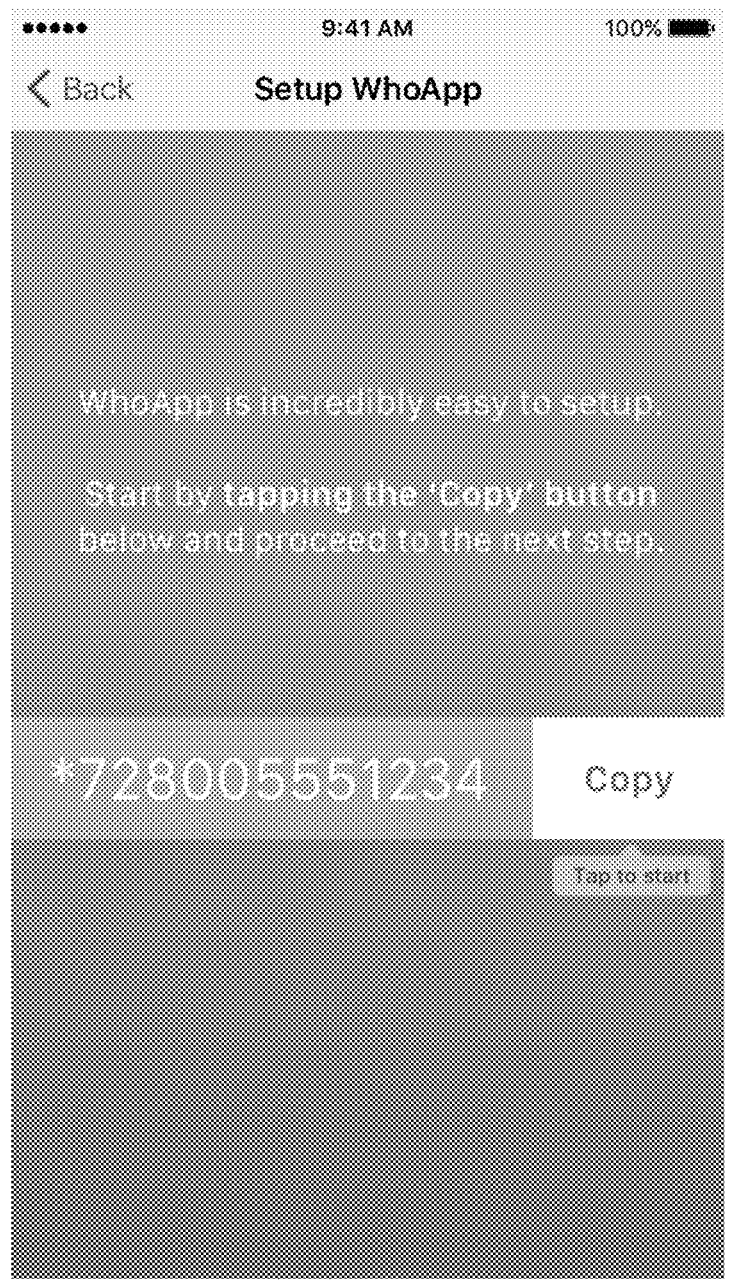
Figure 9:
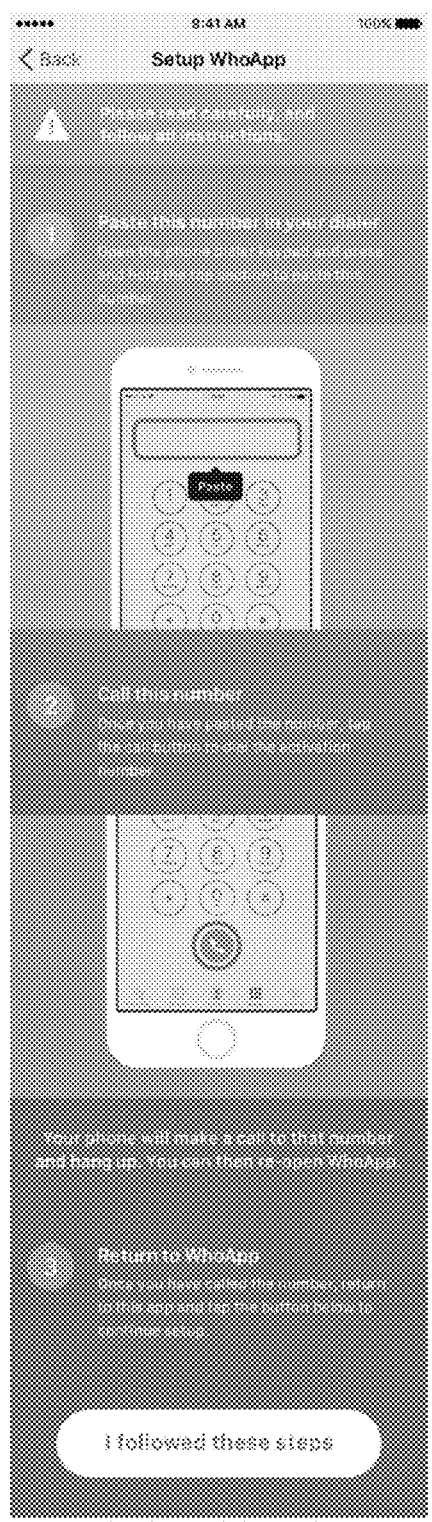

Turning to FIGS. 6-13, the solution calls for downloading an app that takes users through a signup and activation process. In this process users create an account with their phone number (FIG. 6) and an app-provided PIN (FIG. 7). Users then follow an on-screen process to program their conditional call forwarding settings to an app-established DID (direct inward dial) (FIGS. 8 and 9), which operates as a virtual phone number. This process may forward declined, busy, and unanswered calls to the app-based service while allowing other calls to ring through as normal. In the alternative, all calls may be forwarded unconditionally.

Figure 10:
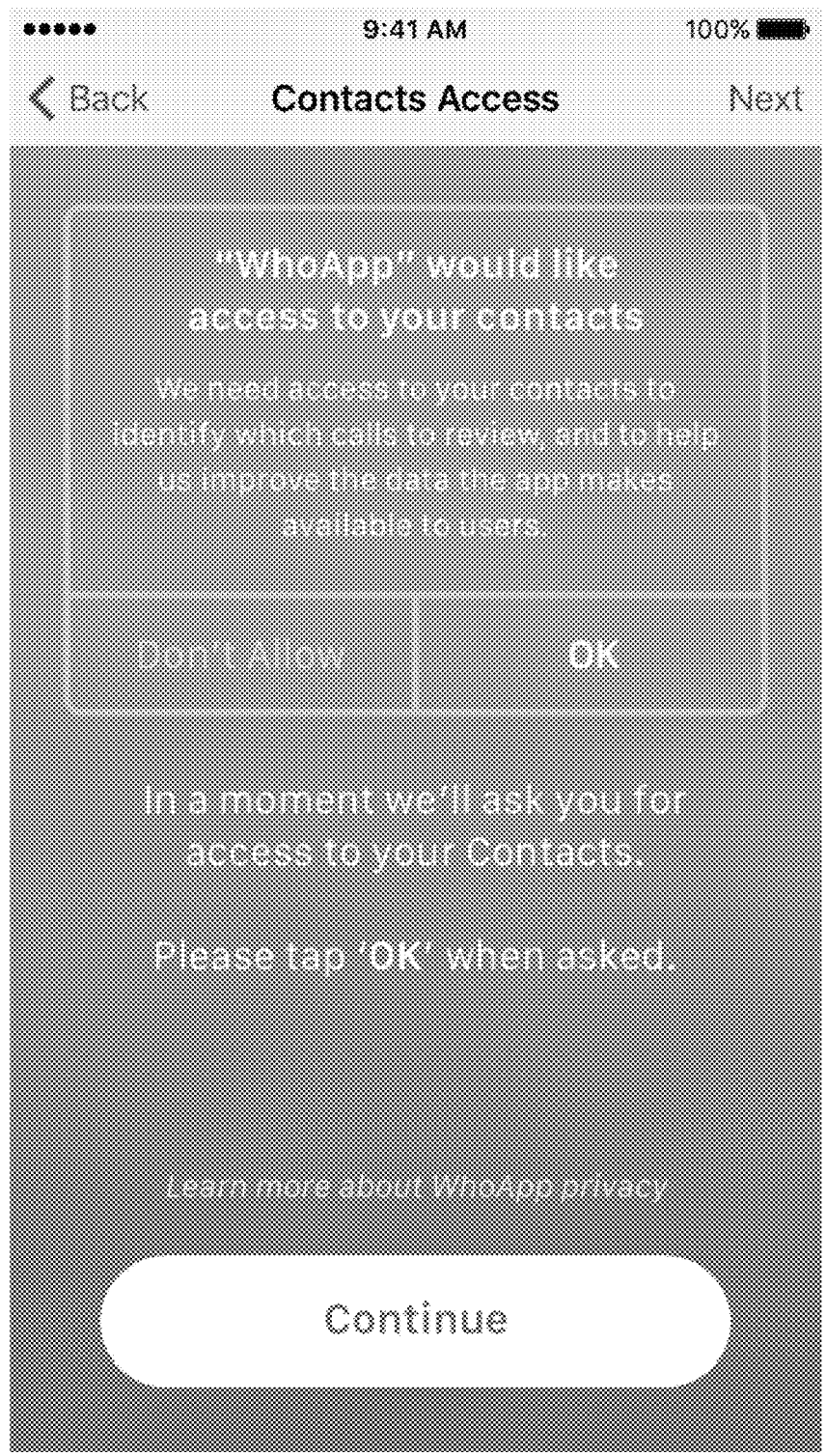
Figure 11:
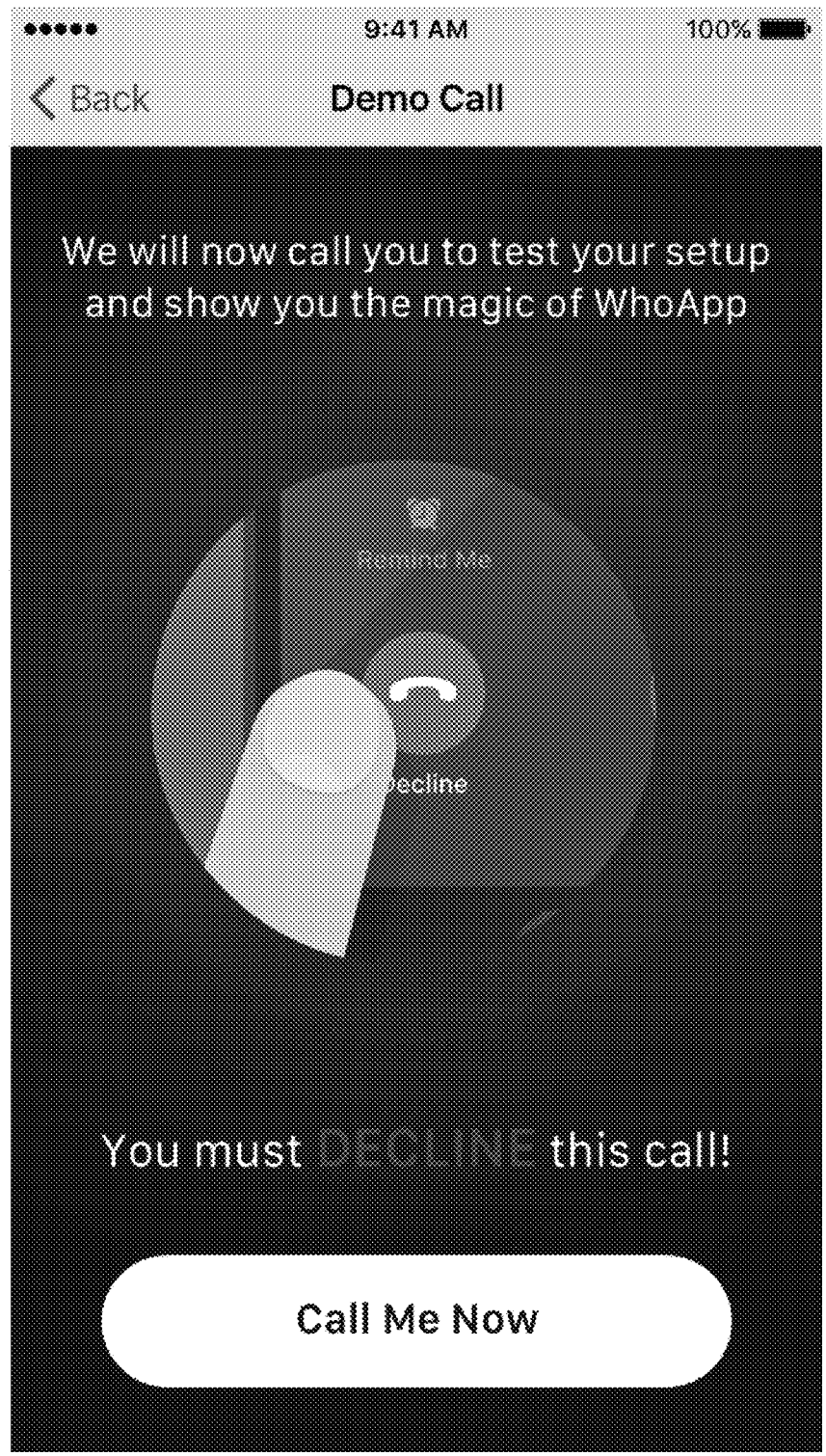
Figure 12:
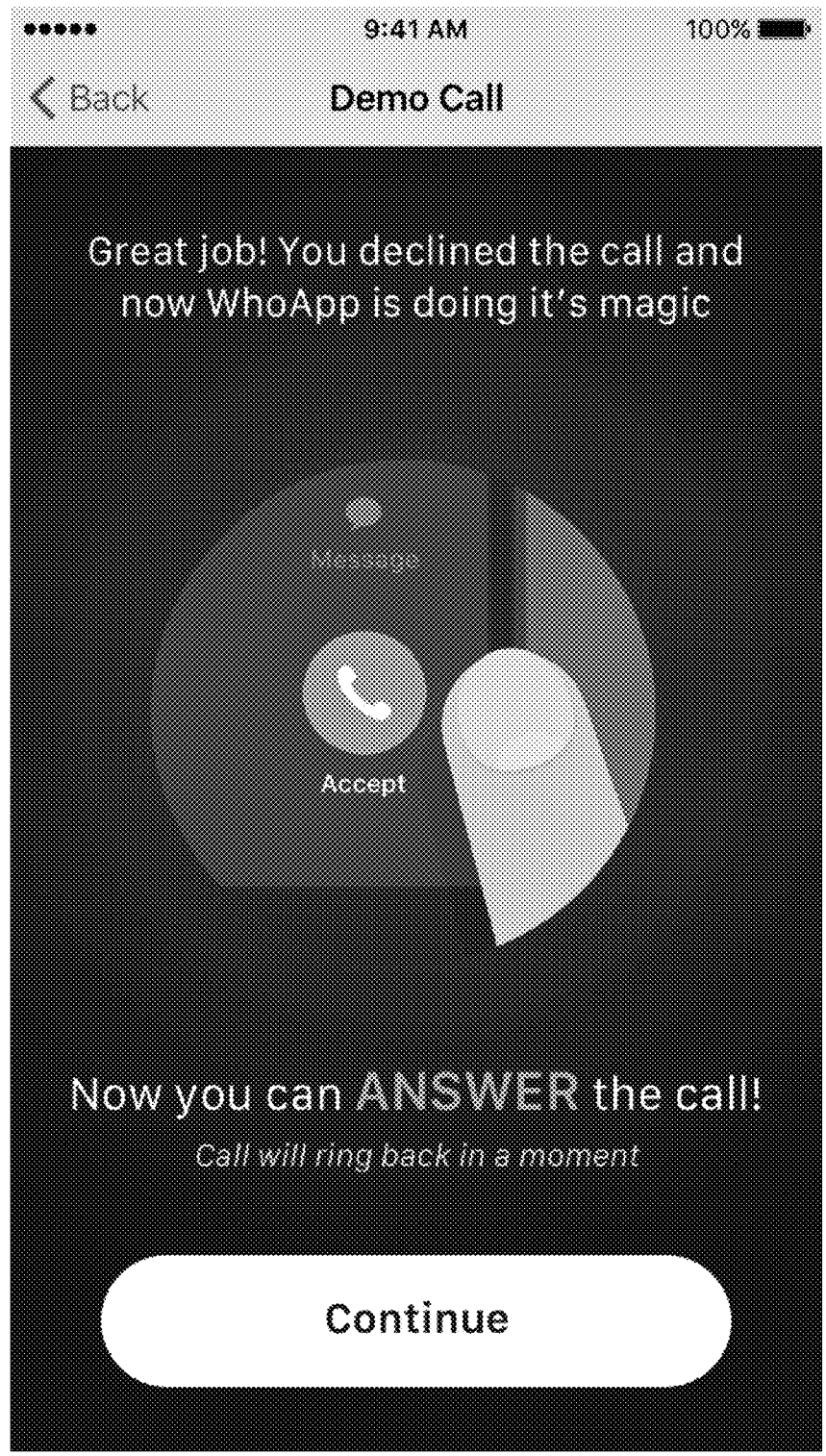
Figure 13:
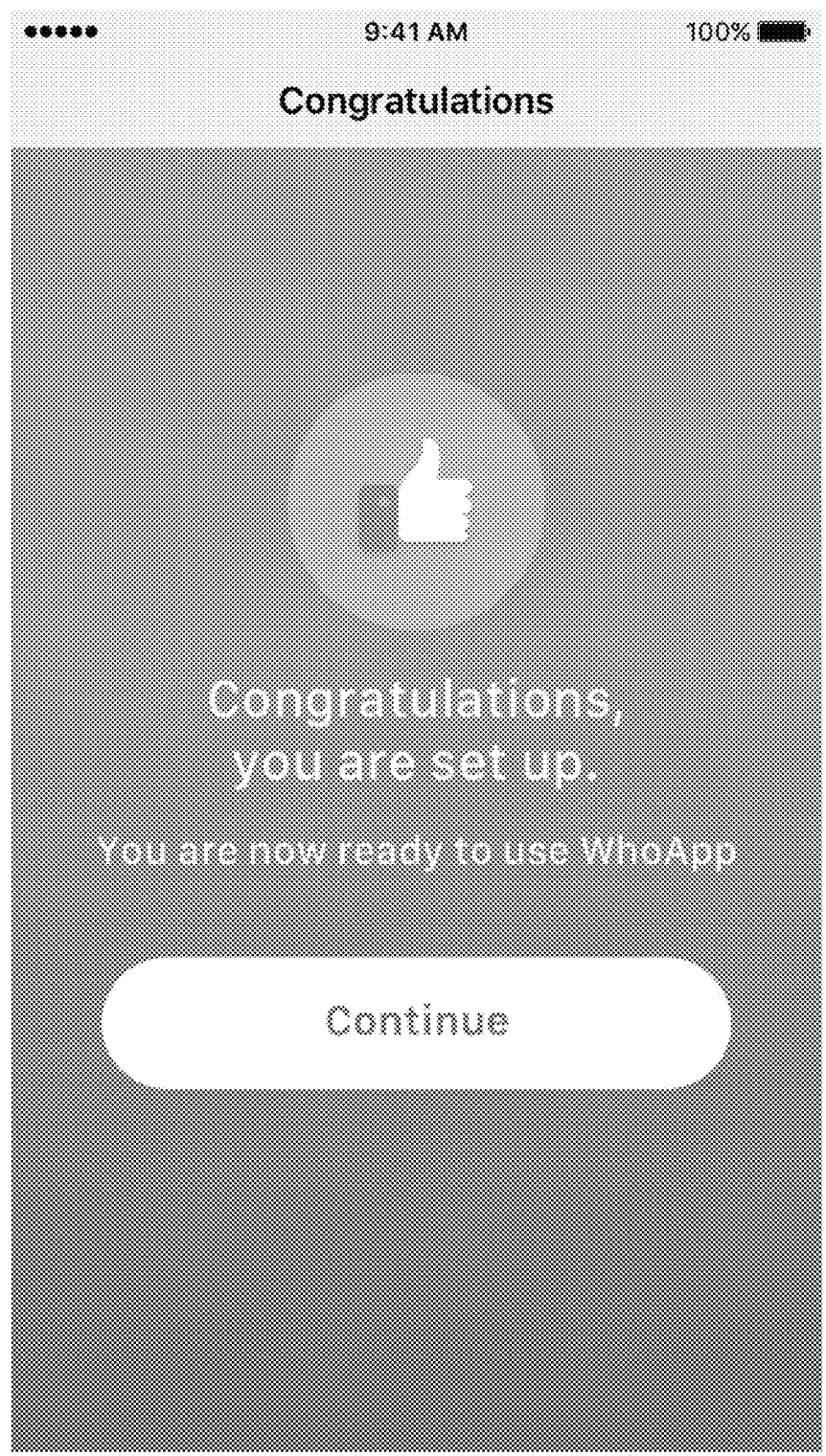

During the process users are required to allow the app to send them notifications, and asked (this is not required) to grant the app access to their contacts on their phone (FIG. 10).

Once a user has completed the setup and activation process they are taken through a test/demo call process (FIGS. 11-13), and logged into their dashboard which may have almost the exact look and feel of the native phone app on a user's phone. The app may also handle a user's voicemail as part of the setup process.

Once setup based on conditional call forwarding, to use the service users simply decline incoming calls from unknown numbers thereby sending the call to the app processing system. The app processing system quickly researches the phone number and locates information related to the phone number. This is accomplished by using one or more of: 1) internal databases of known numbers and related information; and 2) use of external databases accessed from Google, Yelp and the like.

The app then rings the call back to the user as a SIP call (this call is sent over a user's data connection) in real-time. The user is given a notification of the incoming call, and then an answer screen is displayed with all available lookup data and images. The user can accept that call or decline it again and send it to the app voicemail.

The app may be set to not research rejected calls if the user has provided access to their contacts. People on a user's contacts list may ring through without interruption.

The app may query if there is enough network/cell strength based on data throughput. If there is enough then the call is forward to the application over VoIP using SIP. If there is not enough strength, the call is forwarding using POTS (plain old telephone service).

The app may use these same tools to accomplish related tasks. For example, the app may convert an incoming call into a full contact including name, address and related information. Alternatively, if a user wants to learn about an unknown number, the user may enter the number on the keypad. The app will them provide all of the available data before calling. This can be saved as a contact.

The app may be combined with the processing system discussed in parts I and II above to provide a robust experience in call management to manage both robocallers and unknown human callers.

The app may be further combined with tools designed to unmask blocked calls (such as using the TrapCall app) in order to provide information related to blocked calls.

IV. CONCLUSION

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the to be appended claims. It is further noted that the appended claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the to be appended claims shall allow for the inclusion of any additional element irrespective of whether a given number of elements are enumerated in the to be appended claim, or the addition of a feature could be regarded as transforming the nature of an element set forth in the to be appended claims. Except as specifically defined herein, all technical and scientific terms used herein are to be given as broad a commonly understood meaning as possible while maintaining to be appended claim validity.

The breadth of the present invention is not to be limited to the examples provided and/or the subject specification, but rather only by the scope of the to be appended claim language. Use of the term "invention" herein is not intended to limit the scope of the appended claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field of the Invention, etc.) be accorded special significance in describing the invention relative to another or the to be appended claims. All references cited are incorporated by reference in their entirety. Although the foregoing invention has been described in detail for purposes of clarity of understanding, it is contemplated that certain modifications may be practiced within the scope of the to be appended claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   intercepting an incoming call placed by a caller to a receiver, wherein the incoming call comprises incoming call data;
   if a portion of the incoming call data matches a pre-established list of approved callers, forwarding the incoming call to the receiver;
   determining if the portion of the incoming call data matches a pre-established list of disapproved callers;
   answering the incoming call while playing a ringback tone to the caller for a preset time period;
   analyzing incoming call audio during the preset time period to determine if the caller is a human or a machine;
   if the caller is determined to be a human and the portion of incoming data matches the pre-established list of disapproved callers, terminating the call;
   if the caller is determined to be a human and the portion of incoming data does not match the pre-established list of disapproved callers, forwarding the incoming call to the receiver; and
   if the caller is determined to be a machine, forwarding the incoming call to a honeypot server.

2. The method as in claim 1, wherein analyzing the incoming call audio during the preset time period comprises calculating an average amplitude of the amount of noise produced during a segment of the incoming call audio.

3. The method as in claim 2, wherein analyzing the incoming call audio during the preset time period further comprises determining if the segment of the incoming call audio is speech to be further analyzed or background noise to be filtered.

4. The method as in claim 1, wherein analyzing the incoming call audio during the preset time period comprises calculating the distance and regularity of audio spikes produced during a segment of the incoming call audio.

5. The method as in claim 4, wherein analyzing the incoming call audio during the preset time period further comprises determining if the audio spikes are closely correlated around each other.

6. The method as in claim 5, wherein if the audio spikes are closely correlated around each other determining that the caller is likely a machine and if the audio spikes are not closely correlated around each other determining that the caller is likely a human.

7. The method as in claim 1, wherein analyzing the incoming call audio during the preset time period comprises analyzing segments of silence within the incoming call audio.

8. The method as in claim 7, wherein analyzing the incoming call audio during the preset time period further comprises applying a smoothing function that masks small segments of silence.

9. The method as in claim 8, wherein if the segments of silence are extended determining that the caller is likely a human and if the segments of silence are not extended determining that the caller is likely a machine.

10. The method as in claim 1, wherein analyzing the incoming call audio during the preset time period comprises analyzing segments of incoming call audio that are a preset percentage greater than the average amplitude of the incoming call audio.

11. The method as in claim 10, wherein the preset percentage is 10%.

12. The method as in claim 10, wherein if the segments of audio are a preset percentage greater than the average amplitude of the incoming call audio determining that the caller is a likely a machine and if the segments of incoming call audio are not a preset percentage greater than the average amplitude of the incoming call audio determining that the caller is likely a human.

13. The method as in claim 10, wherein if noise within segments of incoming call audio significantly deviates determining that the caller is a likely a human and if the segments of incoming call audio do not significantly deviate determining that the caller is likely a machine.

14. The method as in claim 1 further comprising:
   if the call is forwarded to the honeypot server, gathering information related to the machine based on the incoming call data.

15. The method as in claim 1 wherein forwarding the incoming call to the receiver and forwarding the incoming call to the honeypot server occur via a session initiation protocol.

16. A method comprising:
   a) intercepting an incoming call placed by a caller to a receiver, wherein the incoming call comprises incoming call data;
   b) answering the incoming call while playing a ringback tone for a preset time period to the caller;

c) analyzing the incoming call audio during the preset time period to determine if the caller is a human or a machine, comprising the following steps:
  1) calculating the average amplitude for the amount of noise produced during a segment of the incoming call audio;
  2) calculating the distance and regularity of audio spikes produced during a segment of the incoming call audio;
  3) analyzing segments of silence within the incoming call audio; and
  4) analyzing segments of the incoming call audio that are a preset percentage greater than the average amplitude of the incoming call audio;
d) if the caller is determined to be a human and the portion of incoming data does not match a pre-established list of disapproved callers, forwarding the incoming call to the receiver; and
e) if the caller is determined to be a machine, forwarding the call to a honeypot server.

17. The method of claim 16 further comprising:
if a portion of the incoming call data matches a pre-established list of approved callers, forwarding the incoming call to the receiver.

18. The method of claim 17 further comprising accessing additional information about the caller beyond the incoming call data and presenting that additional information to the receiver prior to forwarding the incoming call to the receiver.

19. A method comprising:
a) intercepting an incoming call placed by a caller to a receiver, wherein the incoming call comprises incoming call data;
b) answering the incoming call while playing a ringback tone for a preset time period to the caller;
c) analyzing the incoming call audio during the preset time period to determine if the caller is a human or a machine, comprising the following steps:
  1) calculating the average amplitude for the amount of noise produced during a segment of the incoming call audio;
  2) calculating the distance and regularity of audio spikes produced during a segment of the incoming call audio;
  3) analyzing segments of silence within the incoming call audio;
  4) analyzing segments of the incoming call audio that are a preset percentage greater than the average amplitude of the incoming call audio; and
  5) smoothing the analysis to screen and exclude segments that likely result from poor audio;
d) if the caller is determined to be a human and the portion of incoming data does not match a pre-established list of disapproved callers, forwarding the incoming call to the receiver;
e) if the caller is determined to be a human and the portion of incoming data matches a pre-established list of disapproved callers, terminating the call; and
e) if the caller is determined to be a machine, forwarding the call to a honeypot server.

20. The method as in claim 19, wherein the forwarding the incoming call to the receiver is accomplished via a session initiation protocol if there is sufficient network strength based on data throughput.

* * * * *